G. W. JOCKERS.
SECURING DEVICE FOR ELECTROLIERS AND THE LIKE.
APPLICATION FILED FEB. 13, 1913.
1,093,332.
Patented Apr. 14, 1914.
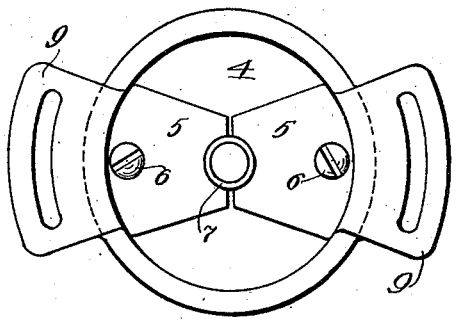
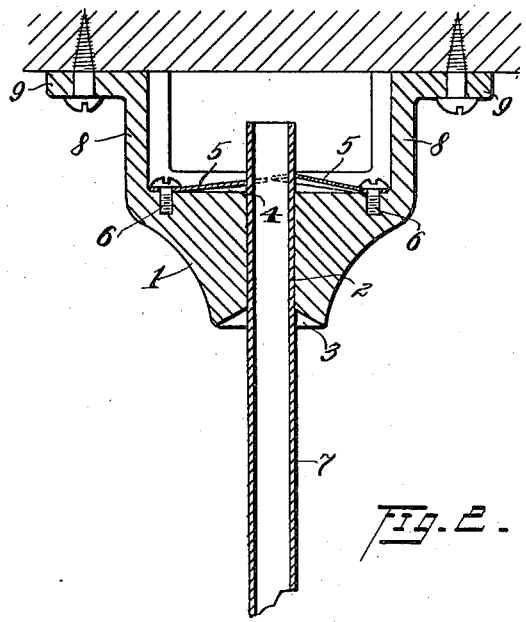
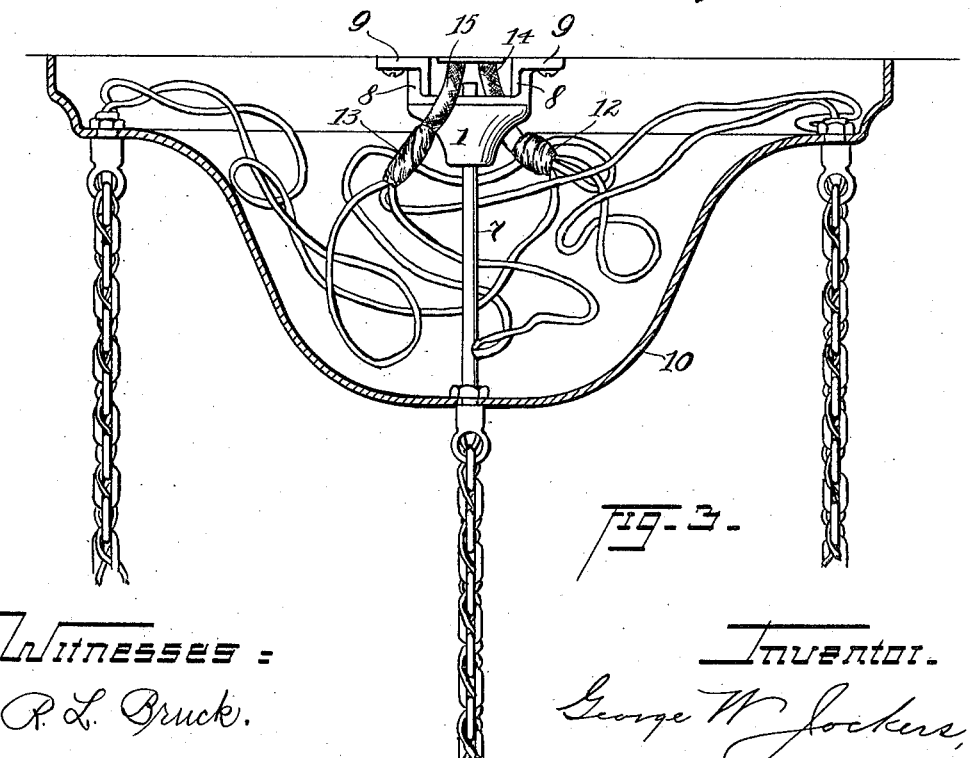
Witnesses:
R. L. Bruck.
Brennan B. West
Inventor.
George W. Jockers,
By Hull & Smith,
Attys.

UNITED STATES PATENT OFFICE.

GEORGE W. JOCKERS, OF CLEVELAND, OHIO, ASSIGNOR TO EVAN H. HOPKINS, OF CLEVELAND, OHIO.

SECURING DEVICE FOR ELECTROLIERS AND THE LIKE.

1,093,332.  Specification of Letters Patent. Patented Apr. 14, 1914.

Application filed February 13, 1913. Serial No. 748,087.

*To all whom it may concern:*

Be it known that I, GEORGE W. JOCKERS, a citizen of the United States, residing at Cleveland, in the county of Cuyahoga and State of Ohio, have invented a certain new and useful Improvement in Securing Devices for Electroliers and the like, of which the following is a full, clear, and exact description, reference being had to the accompanying drawings.

This invention relates to securing devices whereby pipes, rods, tubes, and the like may be secured against movement in the direction of their length, and has particular reference to devices or fittings whereby electroliers or like fixtures may be secured to the ceilings or walls with which they are to be used. Heretofore the installation of such a fixture has been the matter of considerable practical difficulty owing to the wiring requirements. The simplest connection has been that wherein a depending pipe was threaded into a crowfoot or other fitting carried by the ceiling or other support, but this required the twisting of the pipe to screw it into place and this prevented the attachment of the wires until the pipe was completely located; if the wires were connected prior to the attachment of the depending pipe or bracket they became twisted and possibly short-circuited or broken during the attaching process, while if the connection were delayed until after the bracket was secured in place, it was generally a difficult matter to perform owing to the rigidity of the parts and their position in inaccessible places. In addition the bell or cap had to be adjustable relatively to the pipe or bracket so that the same could be moved up against the attaching surface after the attachment of the wires so as to hide the same. This was not particularly objectionable in former years when such fittings were almost entirely made of rods and pipes, but now that chains are more widely employed, the requirement that the ceiling cap must be adjustable has either necessitated a special construction of cap which can be clamped about the chain, or an elongated cylindrical chain-base along which this cap may be moved.

Other expedients such as bayonet joints, snap connections and the like have been suggested, but all have been found wanting on practical grounds either because of their complexity, their expensiveness or their lack of reliability.

The object of the present invention is to produce a securing device of great simplicity, cheapness, reliability and ease of operation, and which can be employed in connection with electroliers and like fixtures with the elimination of difficulties heretofore encountered; the provision of a device of this character wherein a tube or rod can be secured in place with a minimum of time and care and from which the same can be removed in a sufficiently easy manner to permit the disengagement of the same upon occasion, while preventing the casual disconnection thereof; while further objects and advantages will appear as the description proceeds.

Generally speaking my invention may be defined as consisting of the constructions and combinations recited in the claims hereto annexed and illustrated in the drawings accompanying and forming a part of this application, wherein:

Figure 1 is a top plan view of a fitting constructed in accordance with my invention, and having a tube secured therein; Fig. 2 is a vertical cross sectional view through such a fitting and its attached tube; and Fig. 3 is a view in side elevation of part of an electrolier, the ceiling cap being shown in cross-section so as to disclose my improved attachment and illustrate the method of its use.

Describing the parts by reference characters, the attachment comprises a body portion 1 formed with an aperture or bore 2 for the reception of the rod or tube to be secured thereto, the end of the fitting being counterbored if desired as at 3 for the purpose of guiding the inserted member to its seat. The portion of the body member opposite to the counterbored portion is formed with an attaching surface 4, to which are secured one or more thin metal plates 5—5. These plates are here shown as secured against the face 4 of the fitting by means of screws 6—6 at a point removed from the bore 2, though it will be obvious that other means may be employed. In fact it is not necessary that the plates be clamped with great rigidity in case their outer ends butt against the wall of the recess as shown herein, though some means is desirable to prevent loosening or disarrangement of the plates. The free end or ends of such plate or plates extend to and overhang slightly the bore itself, and are preferably shaped to conform substantially to that of the bore. Preferably the number of these plates is greater than one and their arrangement is symmetrical with respect to the bore so that a rod or tube inserted therein may be gripped on all sides.

The forward edges of the plates 5—5 are inclined at a slight angle with reference to the axis of the bore, such inclination (in the case in which two or more plates are employed) being always in the same direction.

7 denotes a cylindrical member which is inserted into the bore 2 displacing the plates 5—5 slightly from their normal position. The laterally yielding nature of these plates permits the free insertion of the member 7 but their longitudinal rigidity prevents the withdrawal of the same by a direct pull. If it be required to disconnect the parts the member 7 may be removed by an unscrewing motion, the inclination of the ends of the plates 5—5 causing the gradual release of the member notwithstanding that the same is not actually threaded or otherwise treated.

When employed as an attachment for an electrolier, the body 1 is preferably provided with upwardly extending legs 8—8 terminating in feet 9—9 adapted to be secured to the ceiling as illustrated in Figs. 2 and 3 by suitable screws passing through suitable apertures in said feet. The sides of the fitting between the legs 8—8 may be left entirely open for the passage of the wires as illustrated in Fig. 3. The member 7 may be secured to any desired form of electrolier or pendant and may be rigidly secured to the cap 10 instead of detachably as heretofore.

Heretofore when an electrolier was installed it has been necessary to effect the wiring and assembling at the same time. The electroliers have been conveyed to the place of installation in a completely disassembled condition, the fixture assembled as it was put in place and the wiring continued as rapidly as the assembling would permit. This has resulted in a great decrease of efficiency as the assembling had to be done under work conditions and not under shop conditions. With the devices illustrated and described in this application the fixtures can be assembled in the shop, the wiring of the fixtures completed, and these wires brought out and connected together to form two terminals 12 and 13 ready for attachment to the main wires 14 and 15 respectively, a sufficient length of the fixture wires being left to permit convenient jointing. After the body fitting 1 has been secured in place, it is but the work of a moment to attach the wires, after which the installation of the fixture is effected instantly by pushing the member 7 into the bore 2. Inasmuch as no rotation of any part of the device is required during the installation, there is no possibility of the wires becoming broken or short circuited. Of course the removal of the fixture requires a rotation thereof, but this can be permitted either by cutting the fixture wires, or by allowing them to become twisted, since the twisting of the wires at this time is unimportant as they will immediately be left open to inspection.

While I have described my invention chiefly as an attachment for electric fixtures it will be obvious that a similar device can be employed with certain small changes in connection with gas fittings or for supporting purposes generally, and I therefore consider such use to fall within the purview of my invention so far as the same may be novel and valuable. I conceive, however, that its main use will be found to be along the lines indicated, from the fact that its employment obviates so many of the disadvantages heretofore observable.

While I have necessarily described my invention in detail, I do not, therefore, propose to be limited to such details except as the same may be positively recited in the claims hereto annexed or may be rendered necessary by the prior state of the art.

Having thus described my invention, what I claim is:—

1. In a device of the character described, the combination, with a receiving member having a bore and an entering member adapted to traverse said bore, said receiving member also having a substantially flat surface transverse to said bore, of a gripping member of yielding sheet metal secured rigidly to said flat surface at a distance from said bore, the end of said gripping member conforming substantially to the shape of said bore and normally overlapping the same to an extent sufficient to cause it to engage said entering member, the free end of said gripping member being yieldable in a direction along the axis of said bore to permit the insertion of said entering member, and being non-yieldable in a direction radially of said bore whereby the direct withdrawal of said inserted member is prevented.

2. In a fixture, the combination, with a receiving member and means whereby said member can be secured against a supporting surface, said receiving member having a bore substantially normal to said surface, and also having a flat surface transverse to said bore, of an entering member adapted to traverse said bore, a gripping member of yielding sheet metal secured rigidly to said flat surface at a distance from said bore, the end of said gripping member conforming substantially to the shape of said bore and normally overlapping the same to an extent sufficient to cause it to engage said entering member, said gripping member being yieldable in a direction axially of said bore to permit the insertion of said entering member and being non-yieldable in a direction radially of said bore whereby the direct withdrawal of said inserted member is prevented, and a hollow cap or bell rigidly secured to said entering member and adapted to engage said supporting surface about said receiving member whereby said receiving member is inclosed.

3. In a device of the character described, the combination with a receiving member having a bore and an entering member adapted to traverse said bore, of a plurality of separate segmental gripping members carried by said receiving member and overlapping slightly the wall of said bore, the ends of said gripping members conforming substantially to the shape of said bore, each of said gripping members being yieldable axially of said bore to permit the insertion of said entering member and being nonyieldable in a direction radially of said bore whereby the direct withdrawal of said inserted member is prevented, and the forward ends of said gripping members being inclined progressively with respect to the axis of said inserted member.

4. In a device of the character described, the combination, with a body member having a cylindrical bore therethrough and a substantially flat securing surface intersected by said bore, of a cylindrical member adapted to be inserted into said bore, a plurality of symmetrically arranged resilient plates rigidly secured to said securing surface at a point removed from said bore and having their forward ends overhanging the sides of said bore, the forward ends of said plates conforming in shape to said bore and being inclined transversely thereof to permit the withdrawal of said inserted member by rotation in the appropriate direction.

5. In a device of the character described, the combination, with a body member having a cylindrical bore therethrough and a smooth surfaced cylindrical member adapted to be inserted into said bore, said body member also having a recess surrounding said bore and a wall surrounding said recess, of a plurality of separate, segmental, normally straight, gripping members secured against the bottom of said recess at a point removed from their inner ends and having their outer ends braced against said wall, the length of said members being greater than the distance between said bore and wall and said members being elastic in the direction of the axis of said bore whereby they may be sprung to permit the free insertion of said entering member and to grip the same upon the inception of any movement of withdrawal, the forward ends of said yielding members being inclined transversely of said bore to permit the withdrawal of said inserted member by rotation in the appropriate direction.

6. In a device of the character described, the combination, with a body having a cylindrical bore and a recess which said bore intersects, of segmental, flat, spring-metal plates in said recess and having their outer ends adjacent to the outer wall thereof and having their inner ends overlapping said bore, means securing said plates against the bottom of said recess at a distance from said bore said plates being yieldable axially of said bore and unyielding in a direction radially of said bore.

7. In a device of the character described, the combination with a body member adapted to be secured to a ceiling and having a vertical bore therein and an attaching surface substantially horizontal, of one or more resilient thin metal plates of segmental shape secured to said surface at a point removed from said bore and having its or their forward end or ends overlapping said bore and formed upon an arc substantially coinciding with the curvature of said bore, a cylindrical member adapted to be inserted in said bore and to be engaged by said plate, and depending devices secured to said cylindrical member.

8. In a device of the character described, the combination of a body member adapted to be secured to a ceiling and having a vertical bore therein and an attaching surface substantially horizontal, resilient thin metal plates secured to said surface at a point removed from said bore and having their forward ends overlapping said bore and formed upon an arc substantially coinciding with the curvature of said bore, the forward ends of said plates being inclined laterally with respect to the horizontal, a cylindrical member adapted to be inserted in said bore and to be engaged by said plates, and depending devices secured to said cylindrical member.

9. In a fixture, the combination, with a receiving member and means whereby said member can be secured against a supporting surface, said receiving member having a bore, of a flexible spring-metal gripping member carried by said receiving member and normally overlapping slightly the wall of said bore, an entering member adapted to traverse said bore, said gripping member being yieldable axially of said bore to permit the insertion of said entering member and being nonyieldable in a direction radially of said bore whereby the direct withdrawal of said inserted member is prevented, and a hollow cap or bell rigidly secured to said entering member and adapted to engage said supporting surface about said receiving member.

10. In a fixture, the combination, with a receiving member and means whereby said member can be secured against a supporting surface, of a second member adapted to be applied to said receiving member, a gripping member carried by said receiving member and arranged so as normally to project into the path of said second member, said gripping member being yieldable so as to permit the application of said second member by a direct movement, and also having a biting portion adapted to grip said second member upon retrograde movement of the same and prevent its withdrawal by a direct pull, and a hollow cap or bell rigidly secured to said second member and adapted to engage said supporting surface about said receiving member, whereby said receiving member will be inclosed and access thereto prevented.

11. In a fixture, the combination, with a receiving member and means whereby said member may be secured to a supporting surface, said receiving member having a cylindrical bore, of segmental gripping members of flexible sheet metal rigidly secured to said receiving member at a point removed from said bore and overlapping slightly the wall of said bore, the ends of said gripping members conforming substantially to the shape of said bore, an entering member adapted to traverse said bore and having a cylindrical outer surface, said gripping members being yieldable axially of said bore to permit the insertion of said entering member and being non-yieldable in a direction radially of said bore whereby the direct withdrawal of said inserted member is prevented, and the forward ends of said gripping members being inclined progressively with respect to the axis of said inserted member, and a hollow circular cap or bell rigidly secured to said entering member and adapted to engage said supporting surface about said receiving member.

12. In a fixture, the combination, with a body member having a cylindrical bore therethrough and means for securing said body member against a supporting surface, of a plurality of symmetrically arranged resilient plates rigidly secured to said body member at points removed from said bore, said plates being substantially perpendicular to said bore and having their forward ends overhanging the sides of the bore, and a cylindrical member adapted to be inserted into said bore, the forward ends of said plates conforming in shape to said bore and being inclined transversely thereof to permit the withdrawal of said inserted member by rotation in the appropriate direction, and a hollow circular cap or bell rigidly secured to said cylindrical member and adapted to engage said supporting surface about said body member simultaneously with the insertion of said cylindrical member into said bore.

13. In a fixture, the combination, with a body member having a bore therethrough and means for securing said body member against a supporting surface, said bore merging with a recess at its upper end, of a plurality of resilient plates in said recess and having their outer ends extending to the wall thereof, said plates being substantially perpendicular to said bore and having their forward ends overhanging the sides of the bore, and an entering member adapted to be inserted into said bore, and a hollow circular cap or bell rigidly secured to said entering member and adapted to engage said supporting surface about said body member simultaneously with the engagement of said entering member by said plates.

In testimony whereof, I hereunto affix my signature in the presence of two witnesses.

GEORGE W. JOCKERS.

Witnesses:
HAROLD E. SMITH,
BRENNAN B. WEST.

Copies of this patent may be obtained for five cents each, by addressing the "Commissioner of Patents, Washington, D. C."